US007278550B2

(12) United States Patent
Bezema et al.

(10) Patent No.: US 7,278,550 B2
(45) Date of Patent: Oct. 9, 2007

(54) METHOD AND SYSTEM FOR ALIGNING COMPONENTS OF A LIQUID DISPENSING SYSTEM

(75) Inventors: Martin Bezema, Oisterwijk (NL); Ronald Buerger, Duesseldorf (DE)

(73) Assignee: Nordson Corporation, Westlake, OH (US)

( * ) Notice: Subject to any disclaimer, the term of this patent is extended or adjusted under 35 U.S.C. 154(b) by 450 days.

(21) Appl. No.: 10/904,458

(22) Filed: Nov. 11, 2004

(65) Prior Publication Data

US 2006/0144849 A1 Jul. 6, 2006

(51) Int. Cl.
*G01F 11/00* (2006.01)
*B67D 5/62* (2006.01)

(52) U.S. Cl. ....................... 222/1; 222/146.5; 222/567; 137/884

(58) Field of Classification Search .................... 222/1, 222/146.5, 567, 570; 137/884
See application file for complete search history.

(56) References Cited

U.S. PATENT DOCUMENTS

| | | | | |
|---|---|---|---|---|
| 3,115,282 | A | 12/1963 | McKenzie | |
| 3,612,069 | A | 10/1971 | Waters et al. | |
| 3,851,801 | A * | 12/1974 | Roth | 222/146.5 |
| 4,549,866 | A | 10/1985 | Granville | |
| 4,600,128 | A | 7/1986 | Rohrer | |
| 4,653,199 | A | 3/1987 | McLeod et al. | |
| 4,688,609 | A | 8/1987 | Diaz | |
| 4,874,014 | A | 10/1989 | Grant et al. | |
| 5,000,112 | A | 3/1991 | Rothen et al. | |
| 5,063,790 | A * | 11/1991 | Freeman et al. | 73/864.14 |
| 5,375,738 | A * | 12/1994 | Walsh et al. | 222/1 |
| 5,478,224 | A | 12/1995 | McGuffey | |
| D401,600 | S | 11/1998 | Byerly et al. | |
| 5,915,625 | A | 6/1999 | Focke et al. | 239/112 |
| 6,056,155 | A | 5/2000 | Byerly et al. | 222/1 |
| 6,089,413 | A | 7/2000 | Riney et al. | |
| D429,263 | S | 8/2000 | Auber et al. | |
| 6,105,832 | A | 8/2000 | Beck | 222/571 |
| 6,123,302 | A | 9/2000 | Taylor | 248/231.61 |
| 6,260,583 | B1 | 7/2001 | Flatt et al. | |
| 6,286,721 | B1 * | 9/2001 | Pellegrini | 222/129.1 |
| 6,354,463 | B1 | 3/2002 | Pahl | 222/1 |
| 6,358,322 | B1 | 3/2002 | Pahl | 118/680 |
| D456,427 | S | 4/2002 | Gressett, Jr. et al. | D15/144 |
| 6,406,625 | B1 | 6/2002 | Brock et al. | |
| D460,092 | S | 7/2002 | Gressett, Jr. et al. | D15/144.1 |
| 6,435,425 | B1 | 8/2002 | Saidman | |

(Continued)

OTHER PUBLICATIONS

Watlow Electric Manufacturing Companys, Revolutionizing the Heater Industry, Brochure, 7 pgs. 2001.

(Continued)

*Primary Examiner*—Joseph A. Kaufman
(74) *Attorney, Agent, or Firm*—Wood, Herron & Evans, L.L.P.

(57) ABSTRACT

In a liquid dispensing system having a dispensing module and a manifold or service block, the manifold includes an vertically oriented interactive portion that extends, for example, outwardly from a front side and the dispensing module includes a correspondingly shaped interactive portion configured to engage the manifold so that the dispensing module is automatically aligned. The increased surface area in contact between the module and manifold improves their sealing engagement and heat transfer with one another, reduces leakage, and permits increased operating pressures.

19 Claims, 2 Drawing Sheets

U.S. PATENT DOCUMENTS

| | | | |
|---|---|---|---|
| 6,572,033 | B1 | 6/2003 | Pullagura et al. |
| 6,601,741 | B2 | 8/2003 | McGuffey |
| 6,669,057 | B2 | 12/2003 | Saidman et al. |
| 6,931,205 | B2 | 8/2005 | Atkins |
| 7,052,548 | B2 | 5/2006 | Jones |
| 7,052,549 | B2 | 5/2006 | Chambers et al. |
| 2003/0080155 | A1 | 5/2003 | Jeter |
| 2003/0192292 | A1 | 10/2003 | Seedorf |
| 2003/0200921 | A1 | 10/2003 | Crane et al. |
| 2004/0033069 | A1 | 2/2004 | Atkins |
| 2005/0235909 | A1 | 10/2005 | Jones |
| 2005/0235911 | A1 | 10/2005 | Chambers et al. |
| 2005/0236316 | A1 | 10/2005 | Gould et al. |

OTHER PUBLICATIONS

Keystone Industries, Adhesive Applicator Systems & Parts, Catalog Year 2001, 5 pgs.

U.S. Patent and Trademark Office, Office Action in U.S. Appl. No. 10/976,953, Mar. 16, 2007.

* cited by examiner

METHOD AND SYSTEM FOR ALIGNING COMPONENTS OF A LIQUID DISPENSING SYSTEM

FIELD OF THE INVENTION

The present invention generally relates to liquid dispensing systems having separate components that are coupled together and, more particularly, to the manners in which such components are fastened together.

BACKGROUND OF THE INVENTION

Viscous liquids or fluids are applied by dispensers onto a surface of a substrate in a variety of dispensing applications employed in the manufacture of products and product packaging. These viscous liquids include thermoplastic materials such as hot melt adhesives. Liquid dispensers utilize pneumatically or electrically actuated valve assemblies for metering a precise quantity of the viscous liquid and discharging the metered amount through a small-diameter dispensing orifice. Many thermoplastic materials exist in a solid form at room or ambient temperature and must be heated to create a flowable viscous liquid. Other hot melt adhesive materials are supplied as liquids at room temperature. A solid form of material is placed in a holding tank having heated walls and is melted by heating the solid material above its melting point. The viscous liquid is pumped in a molten state under pressure from the holding tank through a supply conduit to a manifold block. The manifold block has liquid passageways connected in fluid communication with the dispensing orifice of one or more liquid dispensers.

A dispensing module that includes the dispensing orifice is usually connected to the manifold, (sometimes referred to as a service block or gun manifold), by way of screws or bolts that extend through the module and into threaded holes in the face of the gun manifold. The combined service block or manifold and the module is typically referred to as a gun. In order for the liquid dispensing system to operate properly, this connection of the manifold with the module must be accomplished so that liquid ports on each of the manifold and module are properly aligned so as to provide leak-proof fluid communication between the two subassemblies or components. In the case of a pneumatically operated module and/or one which provides air-assisted liquid dispensing, cross-connection of an air port with an adhesive port must be avoided. Connecting the two subassemblies entails placing the module in its proper position and then, while holding the module steady, threading the connecting bolts through the module into the manifold. Misalignment during the assembly process may cause the adhesive to leak from the gun onto a conveying system and/or substrate as well as to leak into the air section of the module.

Oftentimes, operational or maintenance personnel will need to remove the module from the manifold for such purposes as cleaning or attaching a different module. Thus, a need exists for an interface between a module and a gun manifold that simplifies attachment of the module, prevents misalignment of the two subassemblies and their respective liquid ports during attachment, reduces the likelihood of liquid leaking into the air section, and prevents misconnecting the two subassemblies.

SUMMARY OF THE INVENTION

The present invention generally comprises an apparatus for dispensing liquid thermoplastic material including a first component having a first side and at least one passageway for receiving the liquid thermoplastic material. The passageway includes an opening on the first side and the first component further includes a first interactive portion with a first undercut. The first interactive portion and the first undercut are adapted to extend vertically and further adapted to cooperate with a second interactive portion and a second undercut extending vertically on a second component. The first component further includes a transversely extending interactive portion that allows the vertically extending first and second interactive portions to be engaged with each other by moving at least one of the first and second components in a transverse direction, such as a horizontal direction, before engaging the undercuts together by moving at least one of the first and second components in a vertical direction.

The first and second components may, for example, comprise a gun manifold and a dispensing module. For dispensing systems which require pressurized air for actuation of a valve inside the module or for producing particular liquid dispensing patterns, the first and second components may further include respective first and second air ports which communicate together when the first and second interactive portions are in cooperation. The first and second interactive portions may, for example, be dovetail shaped, or they may have other shapes such as curvilinear shapes. A fastening mechanism, such as a quarter turn fastening mechanism, or any other suitable fastening mechanism is used to fix the first and second components together once the appropriate ports have been aligned.

These and other features, objects and advantages of the invention will become more readily apparent to those of ordinary skill in the art upon review of the following detailed description, taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to illustrate various embodiments of the invention.

DETAILED DESCRIPTION

Various terms of spatial reference and orientation are used throughout this specification and claims, such as “front”, “vertical”, “upward”, “downward” and the like. Such terms are not to be construed in a limiting manner, but are merely used for the sake of clarity in describing the examples and embodiments of the invention described herein based on a helpful reference point.

Figure 1:
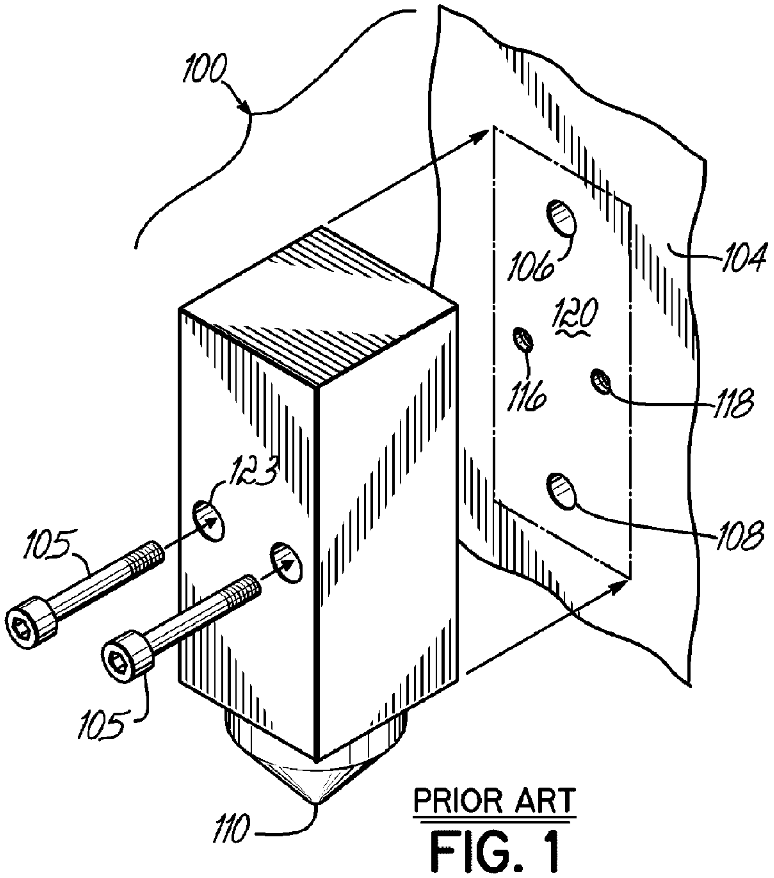
PRIOR ART FIG. 1
FIG. 1 illustrates a prior-art fluid system having a gun manifold and module with flat mating surfaces.

FIG. 1 illustrates a schematic view of a portion of a conventional liquid dispensing system 100 having a module 102 and a gun manifold 104. As known to one of ordinary skill in this art, this system 100, when the manifold or service block 104 and module 102 are assembled together, the assembly is typically connected to a source of melted adhesive (not shown) and, if necessary, a pressurized air source (not shown). In packaging applications, such a system 100 is mounted and a substrate moves in relation to the system; in other applications, the system 100 is mounted on a movable platform and controlled by a robot or other automated positioning system. Ultimately, the module 102 includes a dispensing orifice 110 to deliver adhesive or other liquid in a controlled manner.

In operation, the module 102 is connected to the gun manifold 104 using through-bolts 105 that engage the holes 112, 114 on the module 102 and the holes 116, 118 on the gun manifold 104. Thus, a flat mating surface on the "back" of the module 102 will be placed in contact with a flat mating surface 120 of the gun manifold 104. Although not visible in the perspective of FIG. 1, the module 102 includes an air orifice, or air port, and a liquid orifice, or liquid port, that each align with the respective air orifice, or port, 106 and liquid orifice, or port, 108 of the gun manifold 104 when the manifold or service block 104 and module 102 are connected together.

Although some dispensing systems, such as the conventional modular dispensing system 100 may use O-rings or washers around the air orifice 106 or liquid orifice 108, the sealing engagement of the module 102 to the gun manifold 104 relies substantially on how precisely the mating surfaces mate with one another and on the action of the securing bolts that hold the two sub assemblies into place. As a result, liquid can sometimes escape the liquid orifice 108 and leak onto a substrate below the system 100 or can migrate to the air orifice 106 where it can cause malfunctions and damage to the system 100. Another shortcoming of the conventional system 100 is that when the module 102 of FIG. 1is being assembled onto a gun manifold 104, the assembler must align the sub assemblies properly and maintain that alignment until the securing bolts (not shown) have been tightened.

Figure 2:
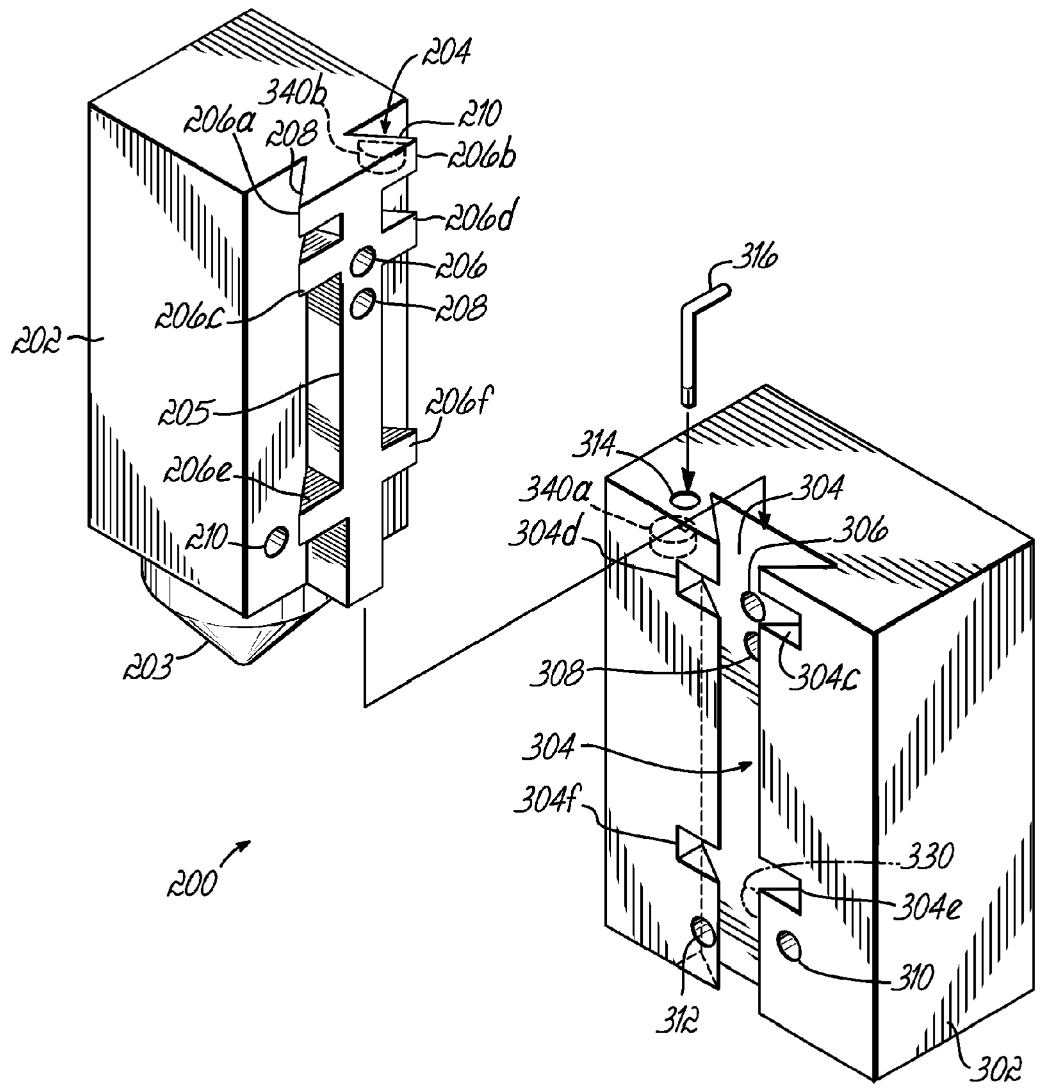
FIG. 2 illustrates an exemplary module having a projecting portion and a gun manifold having a recessed portion in accordance with the principles of the present invention.

FIG. 2 illustrates an exemplary liquid dispensing system 200 having exemplary embodiments of module 202 and manifold or service block 302 in accordance with the principles of the present invention. The following description of module 202 and manifold 302 focus on an interactive portion 204 of the module 202 that mates to cooperating interactive portion 304 on manifold 302. The module and manifold described herein may include any desired features typically present in liquid dispensing guns such as hot melt pneumatic or electric adhesive guns. In particular, the module 202 includes a dispensing nozzle 203 that dispenses liquid (e.g., hot melt adhesive) in a controlled manner. Although not visible in FIG. 2, the module 202 includes air orifices 206, 208 and a liquid orifice 210 that couple with respective air orifices 306, 308 and liquid orifice 310 on gun manifold 302. In this manner, the gun manifold 302 transfers air and liquid to the module 202. Although not shown, the module and/or manifold may have additional sealing means such as O-rings or the like incorporated into the assembly to assist with preventing leakage of air and liquid. As known in this art, the air is used to control the action of an internal valve element (not shown) by which the liquid is dispensed from the module 202.

According to the principles of the present invention, interactive portion 204 is a projection that extends outwardly from the rear face of the module 202 and in a substantially vertical direction along the length of the module 202. The exemplary shape of one projection 204 205, in FIG. 2, is rectangular with dovetail shaped transverse interactive portions 206*a-f*. Other shapes are also considered to be within the scope of the present invention.

Interactive portion 304 of gun manifold 302, is a recess that is shaped complementary to the projection 204 of the module 202. Recess 304 also includes transversely extending recess portions 304*c-f* which is formed to receive respective transverse projections or interactive portions 206*c-f*. Interactive portions 206*a*, 206*b* are initially received over the top of recess 304 at the same time by, for example, moving module 202 transversely (e.g., horizontally) against manifold 302 with projections 206*c-f* in alignment with recesses 304*c-f*. Then the module 202 may slide vertically downward on the gun manifold 302. The capability to slide the module 202 onto the gun manifold 302 in this manner simplifies the assembly of the system 200 by allowing the sub assemblies (i.e., 202, 302) to be quickly positioned together in their correct orientation and by automatically aligning them in the horizontal direction (that is, from side to side) such that only vertical positioning is necessary. Thus, for example, during maintenance of the system 200, downtime due to changing modules 202 may be significantly reduced.

In the exemplary embodiment of FIG. 2, the gun manifold 302 includes two air orifices 306, 308 that will mate with corresponding orifices 206, 208 on the module. One of ordinary skill will recognize that embodiments of the present invention may include different numbers of air orifices and that the two orifices 306, 308 are merely exemplary in nature. Similarly, FIG. 2 depicts another, optional orifice 312 that is included in some dispensing systems to provide pressurized process or pattern air to further control the manner or pattern in which the liquid is dispensed from the module 202.

Figure 2A:
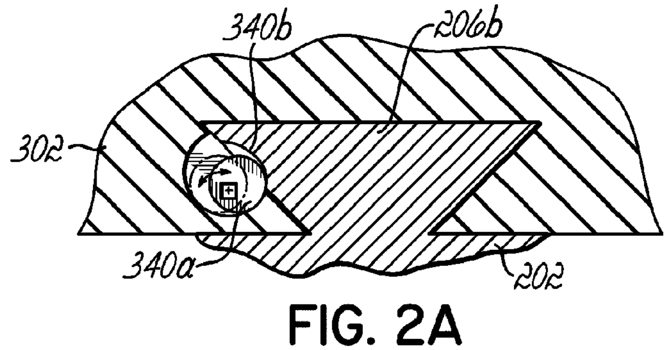
FIG. 2A is an enlarged and fragmented cross sectional view showing one type of fastening mechanism used to secure the module and manifold together.

As for securing the two subassemblies together, the gun manifold 302 includes a mechanical tool 316 that engages an appropriate quarter turn fastener 340*a* to engage a recess 340*b* as schematically shown in FIG. 2A. One of ordinary skill will appreciate that other types of mechanical fasteners or clamping mechanisms may be used to securely hold the module 202 to the gun manifold 302, for example by a quarter turn, thereby permitting quick connecting and disconnecting of the module 202 from the gun manifold 302.

The gun manifold 302 and module 202 provide a number of benefits. For example, the recess 304 and the projection 204 increase the surface area of the mating surfaces where the gun manifold 302 and module 202 contact one another when assembled together. This increase of contact surface area adds to how securely the respective orifices mate with one another and permits use of ultra high pressure liquid transmission without leakage. Furthermore, the mating surfaces of projection 204 and recess 304 are configured so as to oppose separation of the manifold or service block 202 from the module 302. Hydraulic pressure will force module 202 against manifold 302, thereby enabling the assembly to withstand high liquid pressures. Typical liquid dispensing systems operate with liquid pressures approximately in the range of 40-70 psi. Embodiments of the present invention also operate within these ranges but permit operation at higher liquid pressures without fluid leakage. Another result of the increased area of mating surfaces is the improved heat transfer between the gun manifold 302 and the module 202. In certain circumstances it is advantageous for the liquid in the module 202 to maintain its high temperature and improved heat transfer between the manifold or service block 302 and the module 202 help with this goal.

Also, the off-center and displaced alignment of the liquid orifice 310 with respect to the air orifice 306, 308 minimizes the likelihood of liquid reaching the air orifices 306, 308 if leakage were to occur. Any liquid leaking from the orifice 310 would necessarily have to travel in a convoluted path around the other tightly mated surfaces of the projection 204 and the recess before contaminating an air orifice 306, 308. Thus, these regions 204, 304 act as a barrier to prevent liquid from reaching the air orifices 306, 308. The projection 204 and the recess 304 also act as a self-aligning mechanism as well that simplifies the assembly of the module 202 with the gun manifold 302. When an assembler positions the two subassemblies such that the projection 204 and recess 304 cooperate with one another, the module 202 is automatically aligned side-to-side without further action by the assembler.

FIG. 2 includes an alternative embodiment of the present invention that locates the liquid orifice at an alternative location 330 that is aligned with the air orifices 306, 308. While locating the liquid orifice 310 off-center from the air orifices 306, 308 provides the above mentioned advantages, this alternative location 330 illustrates that the self-aligning features and the improved mating surfaces of the present invention can operate separately from the improved isolation of the liquid orifice 310 from the air orifices 306, 308 depicted in the other embodiment.

Figure 3A:
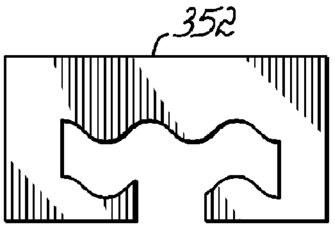
FIGS. 3A and 3B illustrate different exemplary top views of a recessed shape of a gun manifold configured to accept a complementary shaped module in accordance with the principles of the present.
Figure 3B:
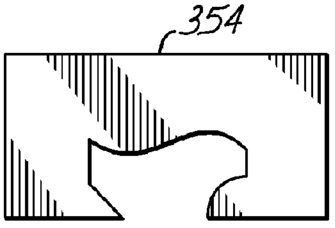

The dovetail shape of the projection 204 and the recess 304 are exemplary in nature and merely one example of how a gun manifold and module can include interactive portions on their mating faces that cooperate with one another when the module and manifold or service block are assembled together. For example, FIGS. 3A and 3B illustrate alternative cross-sectional profiles for the recessed portion of gun manifold. Accordingly, the module would include a complementary shaped projection that would engage the recesses 352 or 354. The profile shapes 352, 354 are non-symmetrical and, therefore, prevent the module from being slid onto the gun manifold upside-down. Such mis-assembly may sometimes occur because modules and gun bodies are frequently operated in a horizontal position or inverted position and determining the correct orientation for the sub assemblies is not always straightforward.

While the present invention has been illustrated by a description of various preferred embodiments and while these embodiments have been described in some detail, it is not the intention of the Applicants to restrict or in any way limit the scope of the appended claims to such detail.

For example, the gun manifold has been described herein as having a recess with the module having a complimentary shaped projection. The present invention contemplates that these interactive portions may be reversed such that the module has a recess designed for a projection on the gun manifold. Also, the present invention explicitly contemplates use within an electrically controlled dispensing module in addition to the pneumatic-type dispensing modules described herein. One of ordinary skill will also recognize that the projections and recesses described herein can be modified in a variety of ways without departing from the scope of the present invention. For example, FIG. 2 depicts the respective regions extending the entire length of the gun manifold 302 and module 202. Alternative embodiments of the present invention contemplate that the projections and recesses may only extend along a portion of the face of the two sub-assemblies instead of the entire face. Similarly, the regions do not necessarily have to be centered on the mating face but may be off-centered as long as the two mating faces are complementary in shape. In addition to those advantages mentioned above, additional advantages include the increased surface area in contact between the module and the manifold which can improve heat transfer and sealing between these components and permit higher operating pressures.

Additional advantages and modifications will readily appear to those skilled in the art. The various features of the invention may be used alone or in numerous combinations depending on the needs and preferences of the user. This has been a description of the present invention, along with the preferred methods of practicing the present invention as currently known.

What is claimed is:

1. An apparatus for dispensing liquid thermoplastic material comprising:

a first component including a first side with a length adapted to be mounted vertically, and at least one passageway for receiving the liquid thermoplastic material, said passageway including an opening on said first side and said first component further including a first interactive portion extending along said length and having a first undercut, said first interactive portion further adapted to cooperate with a second interactive portion and a second undercut extending vertically on a second component, said first component further including a transversely extending interactive portion that allows said vertically extending first and second interactive portions to be engaged with each other by moving at least one of the first and second components transversely relative to said length before engaging said undercuts together by moving at least one of the first and second components in a vertical direction.

2. The apparatus of claim 1, wherein said first component is a gun manifold configured to carry a dispensing module on said first side.

3. The apparatus of claim 2, further comprising said second component, wherein said second component is a dispensing module.

4. The apparatus of claim 3, wherein:

said first component further comprises a first air port; and said second component further comprises a second air port;

wherein, when said first and second interactive portions are in cooperation, said first air port communicates with said second air port.

5. The apparatus of claim 1, wherein said first interactive portion is dovetail shaped.

6. The apparatus of claim 1, wherein said first interactive portion is curvilinear in shape.

7. The apparatus of claim 1, further comprising fastening means for securing said first and second components together.

8. An apparatus for dispensing liquid thermoplastic material comprising:

a first component including a first side with a length adapted to be mounted vertically, a first liquid port for receiving the liquid thermoplastic material, and a first interactive portion formed as a recess with a first undercut and a first transversely extending interactive portion, said recess and said first undercut extending along said length, and said first transversely extending interactive portion extending transversely to said recess, and a second component including a second side with a second length adapted to be mounted vertically, a second liquid port for receiving the liquid thermoplastic material, and a second interactive portion formed as a projection with a second undercut and a second transversely extending interactive portion, said projection and said second undercut extending along said second length, and said second transversely extending interactive portion extending transversely to said projection, wherein said first and second interactive portions may be engaged with each other by moving at least one of the first and second components transversely relative to said first and second lengths to engage said first and second transversely extending interactive portions before engaging said first and second undercuts together by movement in a vertical direction to align said first and second liquid ports.

9. The apparatus of claim 8, wherein said first component is a gun manifold.

10. The apparatus of claim 8, wherein said second component is a dispensing module.

11. The apparatus of claim 8, wherein:

said first component further includes a first air port, and said second component further includes a second air port, wherein, when said first and second interactive portions are in cooperation, said first air port communicates with said second air port.

12. The apparatus of claim 8, wherein said first and second interactive portions are dovetail shaped.

13. The apparatus of claim 8, wherein said first and second interactive portions are curvilinear in shape.

14. The apparatus of claim 8, further comprising fastening means for securing said first and second components together.

15. A method for attaching a first component of a liquid thermoplastic material dispenser to a second component of the liquid thermoplastic material dispenser comprising the steps of:

providing a first component including a first side with a first liquid port for receiving the liquid thermoplastic material and a first interactive portion formed as a recess with a first undercut and a first transversely extending interactive portion, providing a second component including a second side with a second liquid port for receiving the liquid thermoplastic material and a second interactive portion formed as a projection with a second undercut and a second transversely extending interactive portion, engaging the first and second transversely extending interactive portions by moving at least one of the first and second components toward the other in a first direction, engaging the recess and first undercut of the first component with the projection and second undercut of the second component by moving at least one of the first and second components in a second direction transverse to the first direction, aligning the first and second liquid ports in fluid communication with each other; and fastening the first component to the second component.

16. The method of claim 15, wherein the first side further includes a first air port and the second side further includes a second air port, and the method further comprises:

aligning the first and second air ports in fluid communication with each other.

17. The method of claim 15, wherein engaging the recess of the first component with the projection of the second component further comprises:

engaging a first dovetail surface with a second dovetail surface of complementary shape.

18. The method of claim 15, wherein engaging the recess of the first component with the projection of the second component further comprises:

engaging a first curvilinear surface with a second curvilinear surface of complementary shape.

19. The method of claim 15, wherein one of the first and second components is a dispensing module and the other of the first and second components is a manifold.

* * * * *